United States Patent
Ohtsu et al.

(10) Patent No.: US 6,785,199 B2
(45) Date of Patent: Aug. 31, 2004

(54) DRIVE DEVICE INCLUDING A RESTART DRIVE DETECTION ELEMENT

(75) Inventors: Hiroshi Ohtsu, Fukushima (JP); Hironobu Amemiya, Chiba (JP); Masaki Sugiyama, Saitama (JP)

(73) Assignee: Sony Computer Entertainment Inc., Tokyo (JP)

(*) Notice: Subject to any disclaimer, the term of this patent is extended or adjusted under 35 U.S.C. 154(b) by 344 days.

(21) Appl. No.: 10/011,376

(22) Filed: Oct. 22, 2001

(65) Prior Publication Data

US 2002/0048231 A1 Apr. 25, 2002

(30) Foreign Application Priority Data

Oct. 23, 2000 (JP) ........................................ 2000-322861

(51) Int. Cl.[7] ................................................. G11B 7/00
(52) U.S. Cl. ................................ 369/30.36; 360/73.03; 369/53.19
(58) Field of Search ........................... 369/30.36, 53.19; 360/73.03

(56) References Cited

U.S. PATENT DOCUMENTS

| | | | |
|---|---|---|---|
| 5,291,114 A | * | 3/1994 | Shirotori et al. ............. 318/685 |
| 6,087,798 A | | 7/2000 | Ishida |
| 6,282,161 B1 | | 8/2001 | Son et al. |
| 6,430,120 B1 | * | 8/2002 | Chritz et al. .............. 369/30.12 |
| 6,453,260 B1 | * | 9/2002 | Prough ....................... 702/132 |
| 6,577,094 B2 | * | 6/2003 | Ohtsu et al. ................ 318/696 |

FOREIGN PATENT DOCUMENTS

| | | |
|---|---|---|
| EP | 0 984 439 | 3/2000 |
| JP | 04-079794 | 3/1992 |
| JP | 09-009692 | 1/1997 |
| JP | 11-58808 | 3/1999 |
| JP | 11-250551 | 9/1999 |
| JP | 11-251519 | 9/1999 |
| WO | 02/35534 | 5/2002 |

OTHER PUBLICATIONS

US2001/0038743A!, Murata, DVD Video Player, Nov. 8, 2001, entire document 386/82.*

* cited by examiner

Primary Examiner—Aristotelis M. Psitos
(74) Attorney, Agent, or Firm—Katten Muchin Zavis Rosenman

(57) ABSTRACT

A drive device has a feed mechanism that causes a control object to move in order to control the positioning of the control object, a motor that serves as the drive source of said feed mechanism, and a control means that controls this motor. The control means has an operation history memory unit that stores the operation history of whether the motor is doing an initial start or a restart, and a command selection unit that selects control commands and outputs them to said motor based on information stored in said operation history memory unit. Because intermittent operation that repeatedly drives and stops the motor occurs when there is a restart, the thermal shutdown associated with overheating of the driver IC is avoided, and any difference between the feed amount due to the control means and the actual feed amount can be prevented.

4 Claims, 7 Drawing Sheets

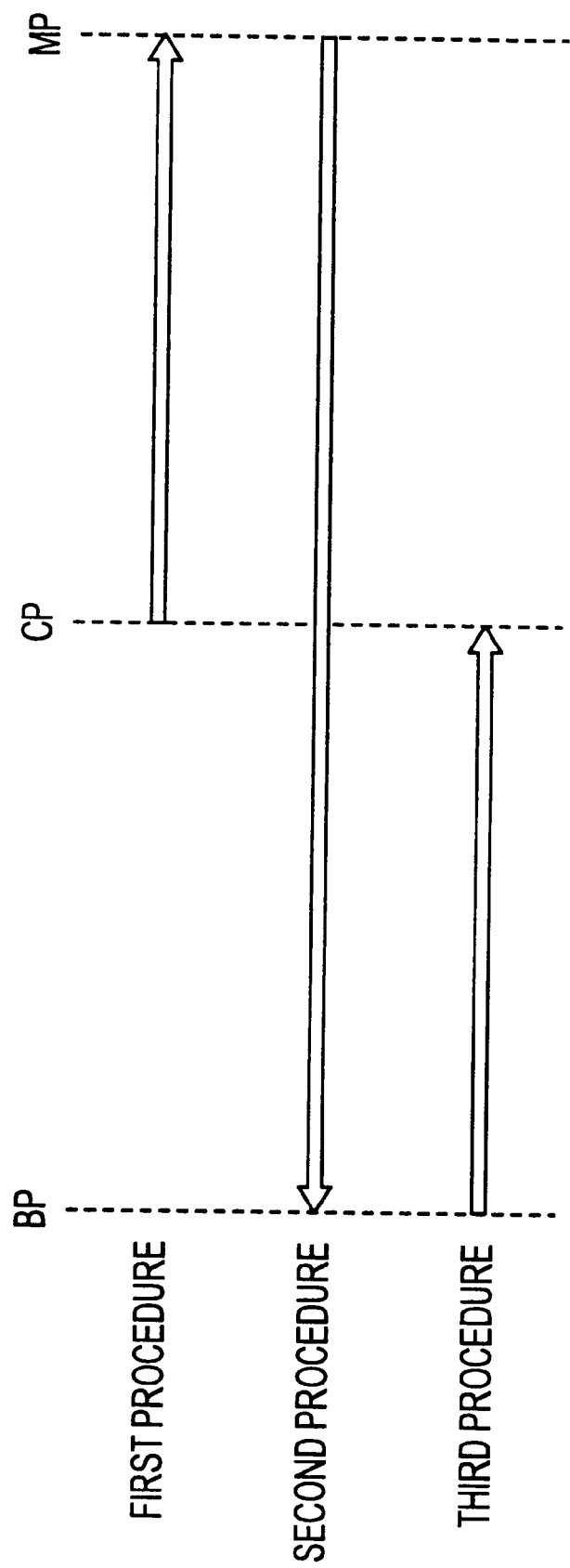

DRIVE DEVICE INCLUDING A RESTART DRIVE DETECTION ELEMENT

FIELD OF THE INVENTION

This invention concerns a drive device that has a feed mechanism that causes a control object to move in order to control the positioning of said control object, a motor that serves as the drive source of the feed mechanism, and a control means that controls the motor by open-loop control; and can be used, for example, as a drive device to position an optical pickup in an optical disk device.

BACKGROUND OF THE INVENTION

An optical disk device that records and plays information on an optical disk such as a CD, DVD, CD-ROM, DVD-ROM, CD-R, DVD-R, etc. has an optical pickup that shines a laser light or other optical spot onto the optical disk and detects information or records information, and a drive device that adjusts the relative position between the optical disk and the optical pickup. Specifically, a drive mechanism will have a spindle servo mechanism, a tracking servo mechanism, a focusing servo mechanism, a slide feed mechanism, and a tilt servo mechanism; among these mechanisms, a stepping motor is adopted as the drive source for the slide feed mechanism and the tilt servo mechanism, and the stepping motor will have a driver IC [integrated circuit] for driving and a control means that outputs control commands to this driver IC.

With such a drive mechanism, by giving control commands to each stepping motor from the pulse step, the stepping motors can be precisely operated in accordance with the steps included in the control commands, which provides the advantage of being able to control the relative positioning of the two with high precision In such positioning control by stepping motors, when a stepping motor is operated continuously for a long time, the driver IC that drives this motor overheats, so a composition is adopted in which this driver IC is provided with a thermal shutdown circuit that includes a temperature detection unit. When the temperature detected by the temperature detection unit reaches or exceeds a fixed temperature, the motor drive is stopped.

However, stopping the motor drive by thermal shutdown in this way is an operation that is unforeseen by the control commands by the control means, so a difference will arise between the software feed amount based on the control commands and the actual feed amount In the case of open-loop control in particular, because there is no feedback of the actual feed position, there is the problem that such a difference in the feed amount cannot be solved, and accurate positioning control cannot be achieved. Such problems do not only arise in optical disk devices but are common problems in devices that include drive devices that control stepping motors, especially with open-loop control.

It is an object of the present invention to provide, in a drive device that has a feed mechanism that causes a control object to move in order to control the positioning of said control object, a motor that serves as the drive source of this feed mechanism, and a control means that controls this motor, a drive device that can perform accurate positioning control while avoiding the thermal shutdown that is associated with overheating of the driver IC that drives the motor.

SUMMARY OF THE INVENTION

The drive device of the present invention has a feed mechanism that causes a control object to move in order to control the positioning of said control object, a motor that serves as the drive source of the feed mechanism, and a control means that controls the motor. The control means has an operation history memory unit that stores the operation history of said motor, and a command selection unit that selects control commands and outputs them to said motor based on information stored in this operation history memory unit. Information about what state the motor is in immediately before outputting control commands is stored in the operation history memory unit, such as, for example, information stored on whether the control commands by the control means are due to the drive device being restarted. The command selection unit selects control commands with reference to the information stored in the operation history memory unit. For example, if the command selection unit judges, based on the information it references, that the drive device has restarted, it is thought that the motor is in operation prior to restarting, so the command selection unit selects a control command to cause the motor to operate intermittently.

Having an operation history memory unit and a command selection unit makes it possible to select the appropriate control commands according to the state of operation of the motors prior to generating and outputting the control commands. Accordingly, one can, while avoiding any thermal shutdown by the driver ICs that drive the motors, prevent the occurrence of any difference between the feed amount due to the control commands from the control means and the actual feed amount, and do accurate positioning control. In the case of an optical disk device restart command in particular, if the motor is made to operate intermittently, then the motor can be operated below the thermal shutdown temperature, and more accurate positioning control can be achieved. If the feed mechanism causes the control object to execute repetitive operation within a prescribed range, it is desirable that the control command to cause the motor to operate intermittently include a command to stop the motor at the turnback points of the repetitive operation. By thus including a command to stop the motor at the turnback points of the repetitive operation, at the turnback points the control object will be in the stopped state, so there is no possibility, even if the motor is stopped at this time, of the control object causing stop position displacement, etc. due to inertia, etc. Therefore, positioning control of the control object can be achieved even if it is a control system that does not feed back the position of the control object after control, such as open-loop control.

Furthermore, if said control object is an optical pickup that shines laser light or another optical spot onto an optical disk and records and/or plays information on said optical disk, it is desirable to adopt the present invention if one is to adjust the tilt position between the optical disk and the optical pickup. As stated above, the optical pickup of an optical disk device must execute various types of positioning control with respect to the optical disk, such as the tracking position, the focusing position, the slide feed position, and the tilt position, so adoption of the device of the present invention will be very significant In the case of tilt position control, because open-loop control is usually adopted in operation at the time of startup, it is possible to do high-precision positioning without any feedback of the actual feed amount

BRIEF DESCRIPTION OF THE DRAWINGS

FIG. 5 is a model diagram expressing the initial operation procedures of the skew adjustment unit.

DETAILED DESCRIPTION OF THE PREFERRED EMBODIMENTS

Figure 1:
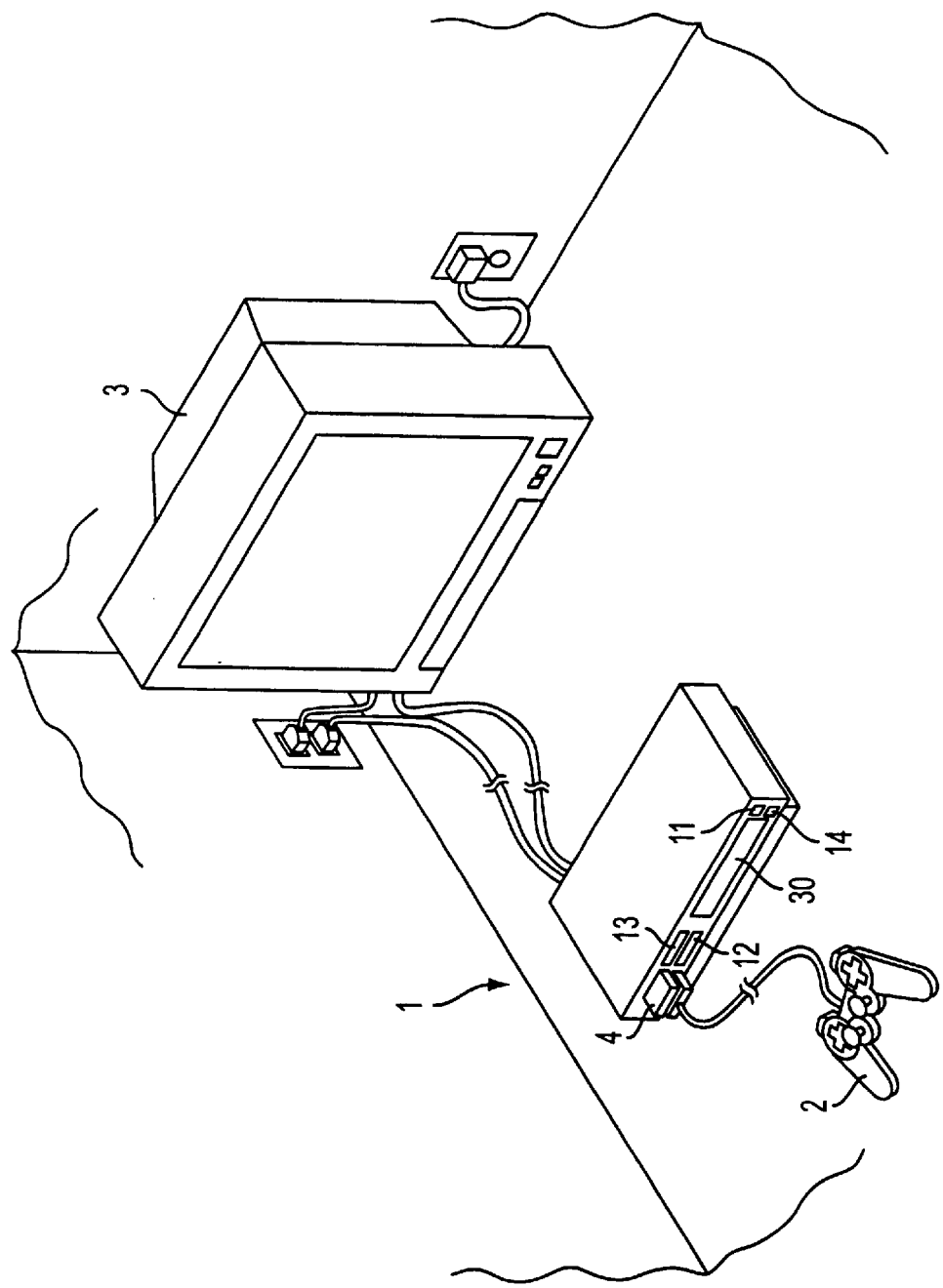
FIG. 1 is a rough perspective view of an entertainment device of an embodiment of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

FIG. 1 shows an entertainment device 1 on which is mounted an optical disk device that includes a drive device of the present invention. Entertainment device 1 executes a game program when a user calls up a game program, etc. recorded on a CD, CD-ROM, DVD, DVD-ROM, or other optical disk and gives instructions by manipulating an operation controller 2; the output of said entertainment device 1 is connected to a television receiver or other display device 3, and the screens during execution are displayed on this display device 3. Electric power is supplied to entertainment device 1 from the commercial public power generally supplied general homes, and entertainment device 1 is started by turning on a master switch, not pictured, that is provided on the rear surface of the device and pressing a power switch 11 provided on the front surface of the device. Power switch 11 may also function as a reset button when it is pressed during operation of entertainment device 1. Controller slot 12 and card slot 13 are provided on entertainment device 1, operation controller 2 is connected to controller slot 12, and memory card 4 is connected to card slot 13. Optical disk device 30 is provided near controller slot 12 and card slot 13, which slots are provided on the front surface of the device. Optical disk device 30 is a disk-loading optical disk device in which, by manipulating operation switch 14, a disk tray advances and retracts from entertainment device 1.

Figure 2:
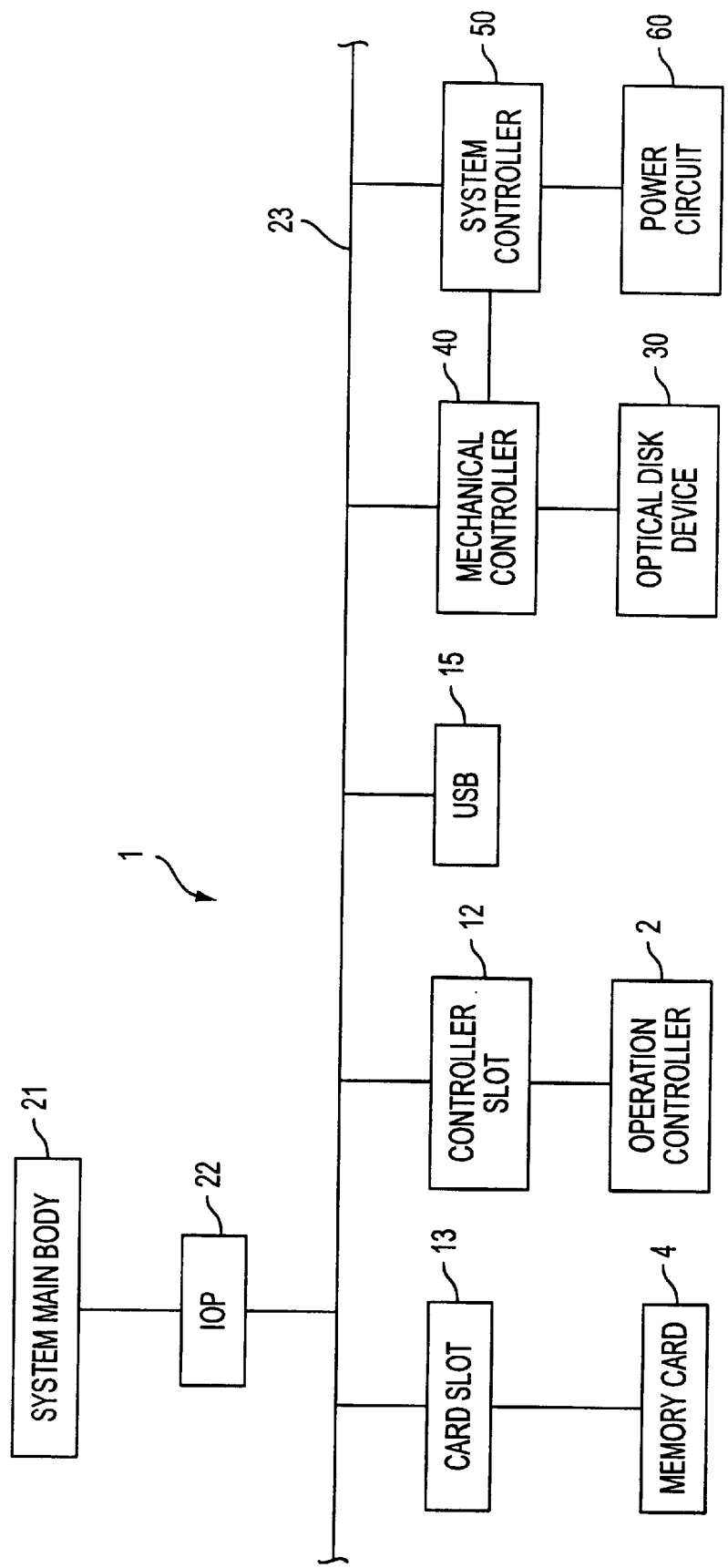
FIG. 2 is a block diagram of the internal structure of the entertainment device of the present invention.

As shown in the block diagram of FIG. 2, the device main body inside entertainment device 1 has system main body 21 as the main board on which the CPU is mounted, an I/O port 22, which is connected to this system main body 21, and connected to I/O port 22, via bus line 23, are controller slot 12, card slot 13, and USB port 15, etc., as well as mechanical controller 40 and system controller 50. System main body 21 performs calculation control of the device as a whole and game programs and other software. System main body 21, through I/O port 22, performs operation control of operation controller 2 and other external devices connected to controller slot 12, card slot 13, and USB port 15, etc. and of mechanical controller 40 and system controller 50, and it processes signals output from external devices, etc. connected to I/O port 22. Mechanical controller 40 performs operation control of optical disk device 30 as described in detail below, and optical disk device 30 is connected to bus line 23 via said mechanical controller 40. System controller 50 controls power source circuit 60 and manages the power supply state of entertainment device 1 as a whole based on operation signals from power switch 11 and signals from sensors (not pictured) that monitor the temperature state of the CPU that constitutes system main body 21. Power source circuit 60 is connected to bus line 23 via system controller 50. Mechanical controller 40 and system controller 50 also have a direct port connection without going through bus line 23, and are constituted so that system controller 50 outputs signals of two levels, low and high, to mechanical controller 40 according to the operation signal of power switch 11. For example, it outputs Low if power switch 11 is pressed at initial startup, and it outputs High if power switch 11 is pressed during operation of entertainment device 1 and a restart command is given.

Figure 3:
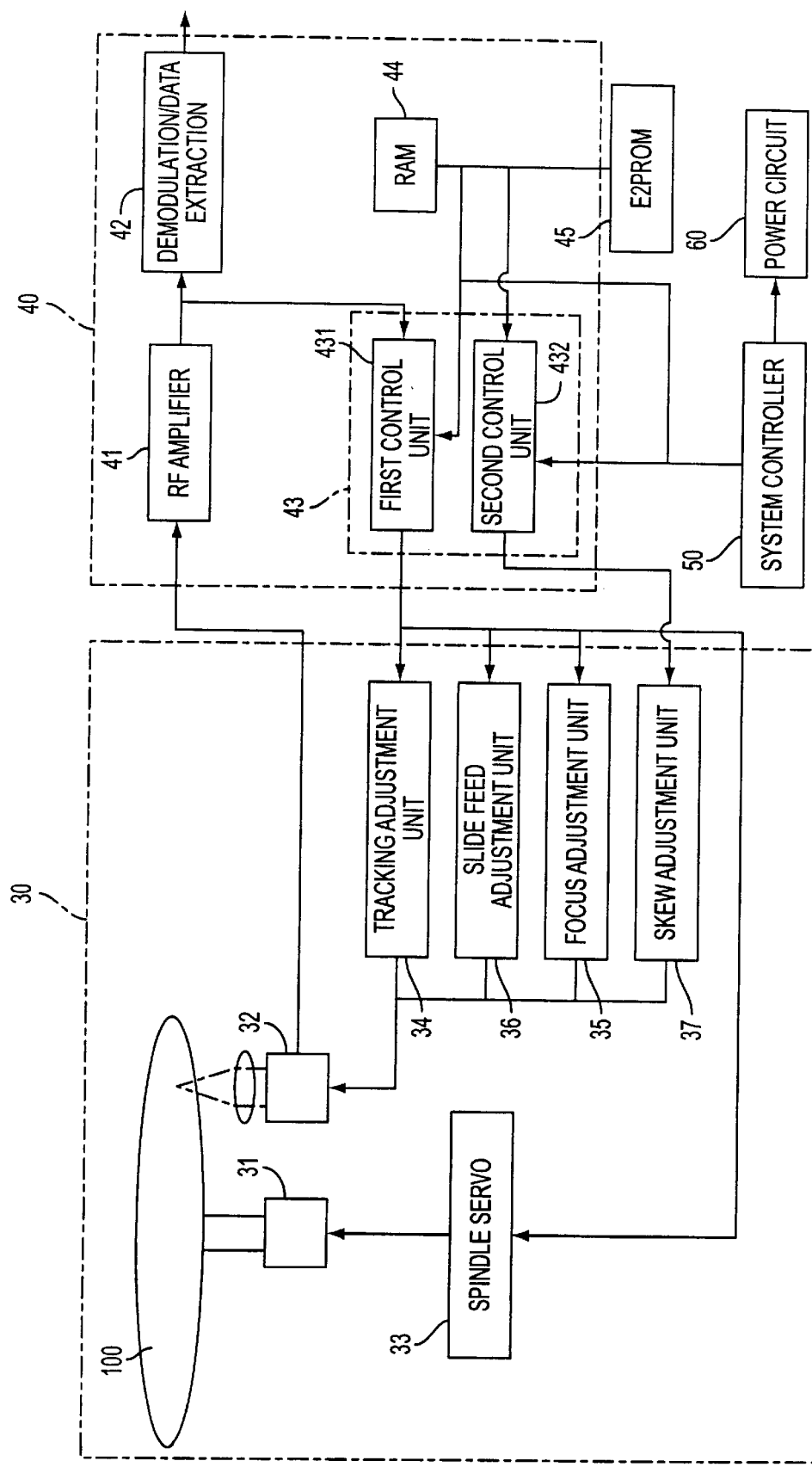
FIG. 3 is a block diagram showing the structure of the optical disk device of the invention and of the mechanical controller that controls the optical disk device.

As shown in FIG. 3, optical disk device 30 has spindle motor 31 and optical pickup 32, spindle sensor unit 33, tracking adjustment unit 34, focus adjustment unit 35, slide feed adjustment unit 36, and skew adjustment unit 37. Although not pictured, adjustment units 34–37 are constituted so as to have a feed mechanism that adjusts the attitude of optical pickup 32 with respect to optical disk 100, and an actuator and stepping motor that serve as the drive source of this feed mechanism. Also, although not pictured in FIG. 3, provided on this optical disk device 30 are a disk tray loading mechanism for extending and retracting the disk tray from entertainment device 1, and a raising and lowering mechanism that raises and lowers spindle motor 31 and optical pickup 32 so that they do not interfere with the disk tray.

Spindle motor 31 rotates optical disk 100 mounted in the disk tray. Provided on the end of the rotation shaft of said spindle motor 31 is a chucking member that engages with the center hole of optical disk 100. Spindle motor 31 is rotation-controlled by spindle servo unit 33 in such a way that optical pickup 32 can be information-detected at a fixed linear speed regardless of the radial-direction position of optical pickup 32 with respect to optical disk 100. Tracking adjustment unit 34 has a two-axis device that adjusts the objective lenses that constitute optical pickup 32 so that the optical spot from optical pickup 32 is shined accurately onto the tracks of optical disk 100, i.e., an actuator that imparts driving force to this two-axis device and a driver IC that drives this actuator. Focus adjustment unit 35 performs position adjustment of optical pickup 32 so that the focus depth of the optical spot from optical pickup 32 is fixed with respect to the information recording surface of optical disk 100. Focus adjustment unit 35 has an advance-and-retract mechanism that position-adjusts optical pickup 32 with respect to the information recording surface of optical disk 100 in the direction of approaching and withdrawing from it, and an actuator that imparts driving force to this advance-and-retract mechanism. Slide feed adjustment unit 36 adjusts the position, in the radial direction, of optical disk 100, of pickup 32 by track jumping, etc. Although not pictured here, unit 36 has a thread feed mechanism that consists of a rack that extends along the radial direction of optical disk 100 and a gear that engages with this rack, a stepping motor that causes this gear to rotate, and a driver IC that drives this stepping motor. Optical pickup 32 is attached on the rack, and when the gear turns by the stepping motor, optical pickup 32 moves by means of the rack along the radial direction of optical disk 100. If track jumping is to be done, first, by the two-axis device of tracking adjustment unit 34, the center of the optical axis of the optical spot is aligned on the track to which the jump is to be made, then optical pickup 32 is slid by the slide feed mechanism. Skew adjustment unit 37 adjusts the tilt of optical pickup 32 with respect to optical disk 100 so that the optical spot shined from optical pickup 32 is incident perpendicular to optical disk 100.

Figure 4A:
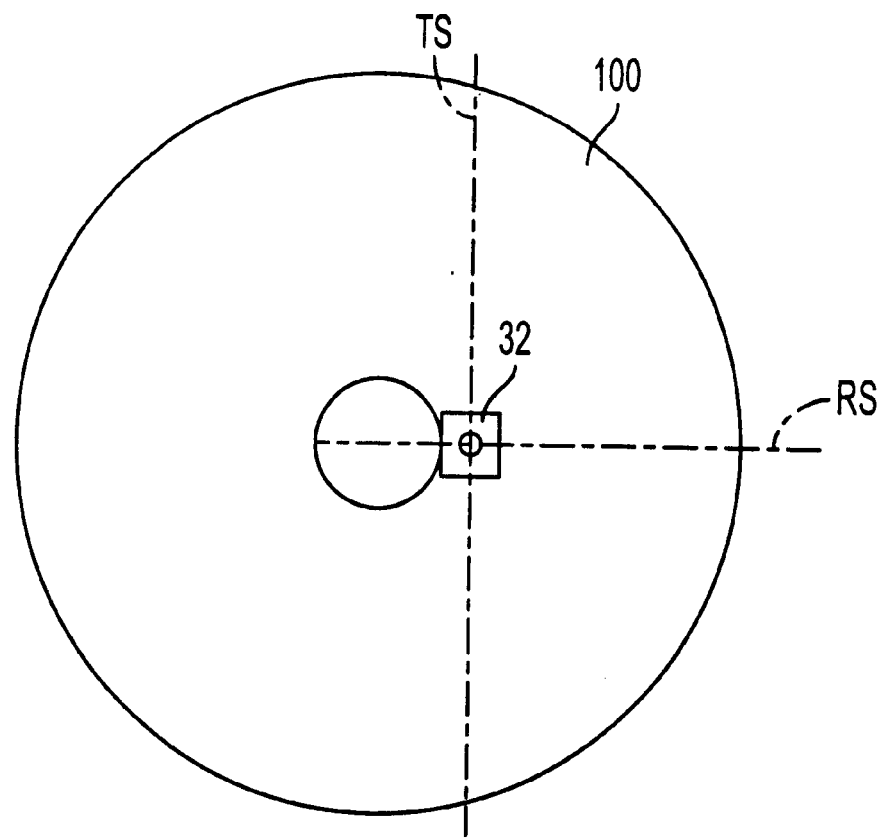
FIGS. 4A and 4B are model diagrams for explaining the skew adjustment method associated with tilt control in the present invention.
Figure 4B:
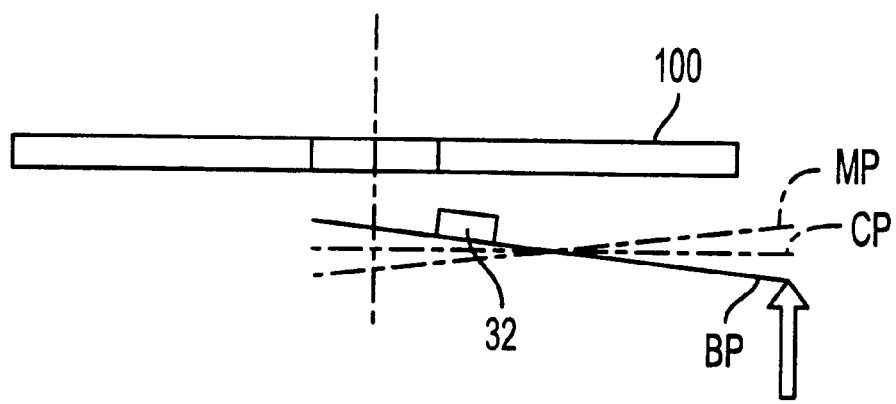

As shown in FIGS. 4A and 4B, skew adjustment unit 37 has a skew angle adjustment mechanism that adjusts the irradiation angle of the optical spot shined from said optical pickup 32 in the range from the base position BP to the maximum feed position MP, taking as the fulcrum the center of the slide feed position of optical pickup 32. A stepping motor (not pictured) serves as the drive source for this skew angle adjustment mechanism, and a driver IC (not pictured) drives this stepping motor. By operating this skew adjustment unit 37, optical pickup 32 is positioned in center position CP so as to lie exactly opposite the information recording surface of optical disk 100. Also, skew adjustment unit 37 makes adjustments in the radial skew direction RS, which is the radial direction of optical disk 100, and does not make any adjustments for the tangential skew direction TS, which is the direction of the tangent to the disk.

Returning to FIG. 3, mechanical controller 40 as control means has RF amplifier 41, demodulation/data extraction unit 42, control unit 43, and RAM 44. Controller 40 is connected directly to system controller 50 by the aforesaid port connection, and it is connected to E2PROM 45, which is mounted on the circuit board that includes mechanical controller 40. RF amplifier 41 amplifies the RF signal input from optical pickup 32 of optical disk device 30 and outputs it to demodulation/data extraction unit 42. Demodulation/data extraction unit 42 demodulates this RF signal and extracts the necessary data, and the extracted data is output via bus line 23 and I/O port 22 to system main body 21 and is processed by system main body 21. Control unit 43 outputs control commands to aforesaid adjustment units 34–37 provided on optical disk device 30, and has first control unit 431 and second control unit 432. First control unit 431 detects RF signals from RF amplifier 41 and generates and outputs control signals to tracking adjustment unit 34, focus adjustment unit 35, and slide feed adjustment unit 36. Closed-loop control is achieved in which different control commands are generated depending on the state of the RF signal. Second control unit 432 generates and outputs control commands to skew adjustment unit 37 and is constituted as a command selection unit that selects and outputs different control commands depending on the two-level signals output from aforesaid system controller 50, and basically open-loop control is achieved.

RAM 44 is the part in which data and computation processing results are stored as necessary when control commands are generated by first control unit 431 and second control unit 432 of control unit 43. The low and high states of the signals output from system controller 50 are temporarily stored in RAM 44 when control commands are generated by control units 431 and 432, and RAM 44 functions as an operation history memory unit. Information about how to operate optical pickup 32 when optical disk device 30 is started is recorded in E2PROM 45. For example, information for generating control commands to skew adjustment unit 37 are recorded. Recorded as information to be used for control commands to skew adjustment unit 37 are, specifically, as shown in FIG. 4B, the maximum feed amount to move optical pickup 32 from base position BP to maximum feed position MP, the center position feed amount to move optical pickup 32 from base position BP to center position CP, and control commands to perform the intermittent operation selected by second control unit 432. The aforesaid feed amounts are recorded as a number of pulse steps to drive the stepping motor, and intermittent operation commands are recorded as repetitions of drive times and stop times, for example, recorded in the form of a drive time value of 5 msec, a stop time value of 300 msec, and the number of iterations thereof.

Second control unit 432 outputs control commands to skew adjustment unit 37 based on information recorded in E2PROM 45 upon initial operation. Such a control command consists of a first procedure, second procedure, and third procedure, as shown in FIG. 5. The first procedure is a procedure that outputs a command to change the tilt angle of optical pickup 32 in the direction from base position BP to maximum feed position MP by the difference between the maximum feed amount and the center position feed amount, and causes optical pickup 32 to move from near center position CP to maximum feed position MP. The feed amount in the first procedure is calculated by having second control unit 432 compute the difference between the maximum feed amount and the center position feed amount recorded in E2PROM 45. The second procedure is a procedure that, following the first procedure, outputs a command to move in the direction toward base position BP by the maximum feed amount, and causes optical pickup 32 to return from maximum feed position MP to base position BP. The third procedure is a procedure that, following the second procedure, outputs a command to change the tilt angle of optical pickup 32 in the direction from base position BP to the maximum feed position MP by the center position feed amount, and causes optical pickup 32 to move from base position BP to center feed position CP.

Adjustment of the tilt position of optical pickup 32 is done in such a way because if a drive device that includes skew adjustment unit 37 and second control unit 432 is open-loop controlled and causes a return to base position BP by an initial operation, then if in the initial operation position a control command is output that is equivalent to the maximum feed amount in the direction toward base position BP, then despite the fact that optical pickup 32 reaches base position BP and stops there, the stepping motor will continue to drive it, an out-of-step condition will arise between skew adjustment unit 37 and the stepping motor, and out-of-step noise will be continuously generated. That is, by executing the above first through third procedures as the initial operation, it is possible to prevent out-of-step noise from being continuously generated.

The two control commands selected by second control unit 432 consist of a continuous operation command to continuously operate the stepping motor, and an intermittent operation command to intermittently operate the stepping motor. The intermittent operation command consists of repetitions of a command to operate the stepping motor and a command to stop the stepping motor. The command to stop the stepping motor is output by the stopping part at the operation turnback points, i.e., it is output between the first procedure and second procedure and between the second procedure and third procedure in the aforesaid initial operation.

Figure 6:
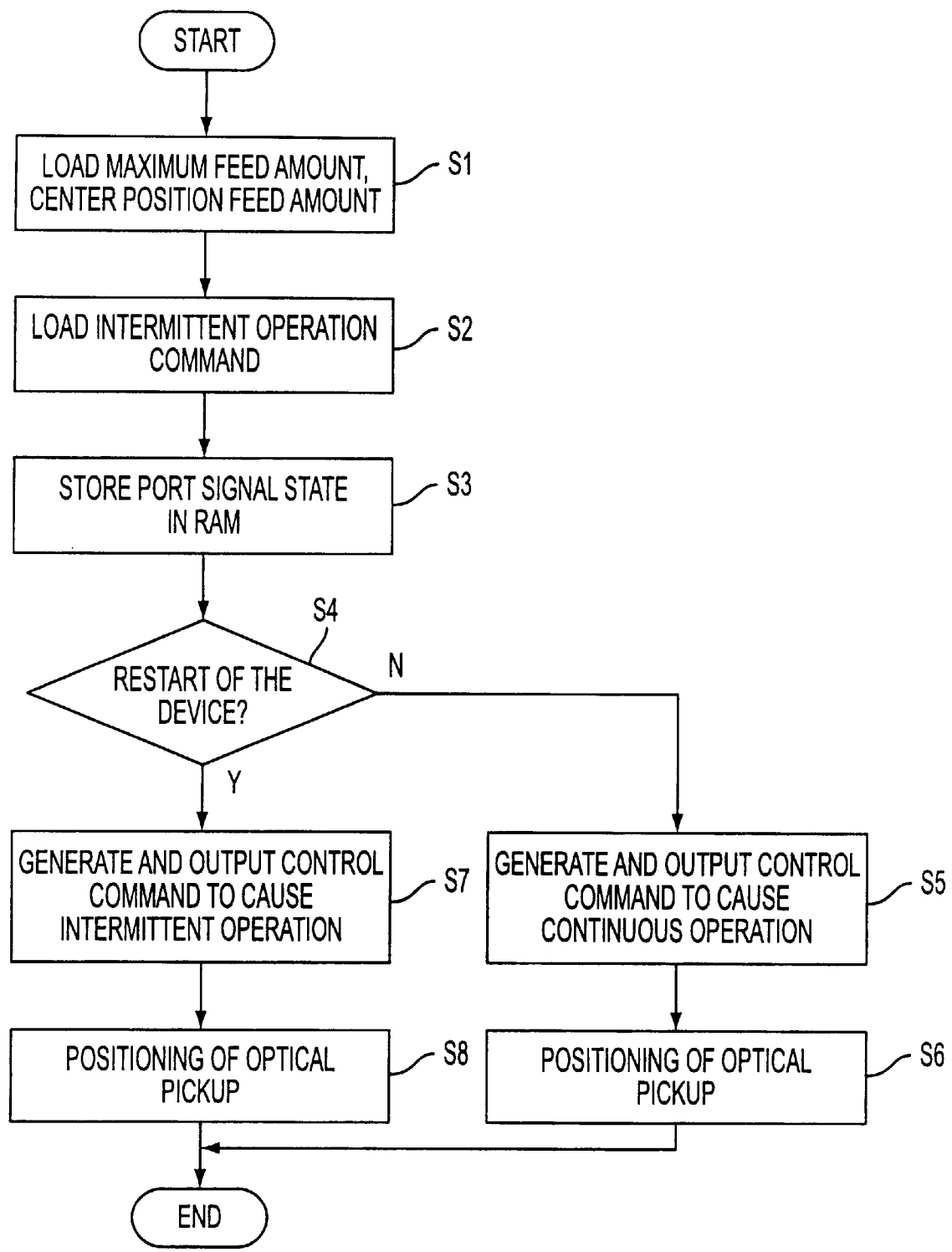
FIG. 6 is a flowchart expressing the control operation by the second control unit in the present invention.

Next, with reference to the flowchart in FIG. 6, the initial operation of skew adjustment unit 37 and second control unit 432, which constitute the drive device of the present invention will be described.

(1) When the operator presses power switch 11 and entertainment device 1 is activated, second control unit 432 loads the maximum feed amount and center position feed amount from E2PROM 45 into RAM 44 (processing S1), and loads the intermittent operation command from E2PROM 45 into RAM 44 (processing S2).

(2) Second control unit 432 detects whether the state of the signal of the port with system controller 50 is high or low, stores this state into RAM 44 (processing S3), and decides whether the operation of power switch 11 is an initial start or a restart (processing S4).

(3) If it is decided that it is an initial start second control unit 432 generates a control command that continuously executes the aforesaid first through third procedures, and outputs it to skew adjustment unit 37 (processing S5). Based on this control command, skew adjustment unit 37 performs positioning of optical pickup 32 (processing S6).

(4) If, on the other hand, it is decided that it is a restart, second control unit 432 generates an intermittent operation command, which includes commands to stop the motor between the first through third procedures, and outputs it to skew adjustment unit 37 (processing S7). This intermittent operation command includes and consists of, for example, a move command as far as the maximum feed position MP by the first procedure, followed for example by a stop command to stop the drive of the motor for 300 msec, a move command that causes a return of base position BP by the second procedure, a stop command to stop the drive of the motor for 300 msec, and a move command as far as center position CP by the third procedure.

(5) Based on this control command, skew adjustment unit 37 performs positioning of optical pickup 32 (processing S8).

The above-described embodiment has the following effects.

Figure 7:
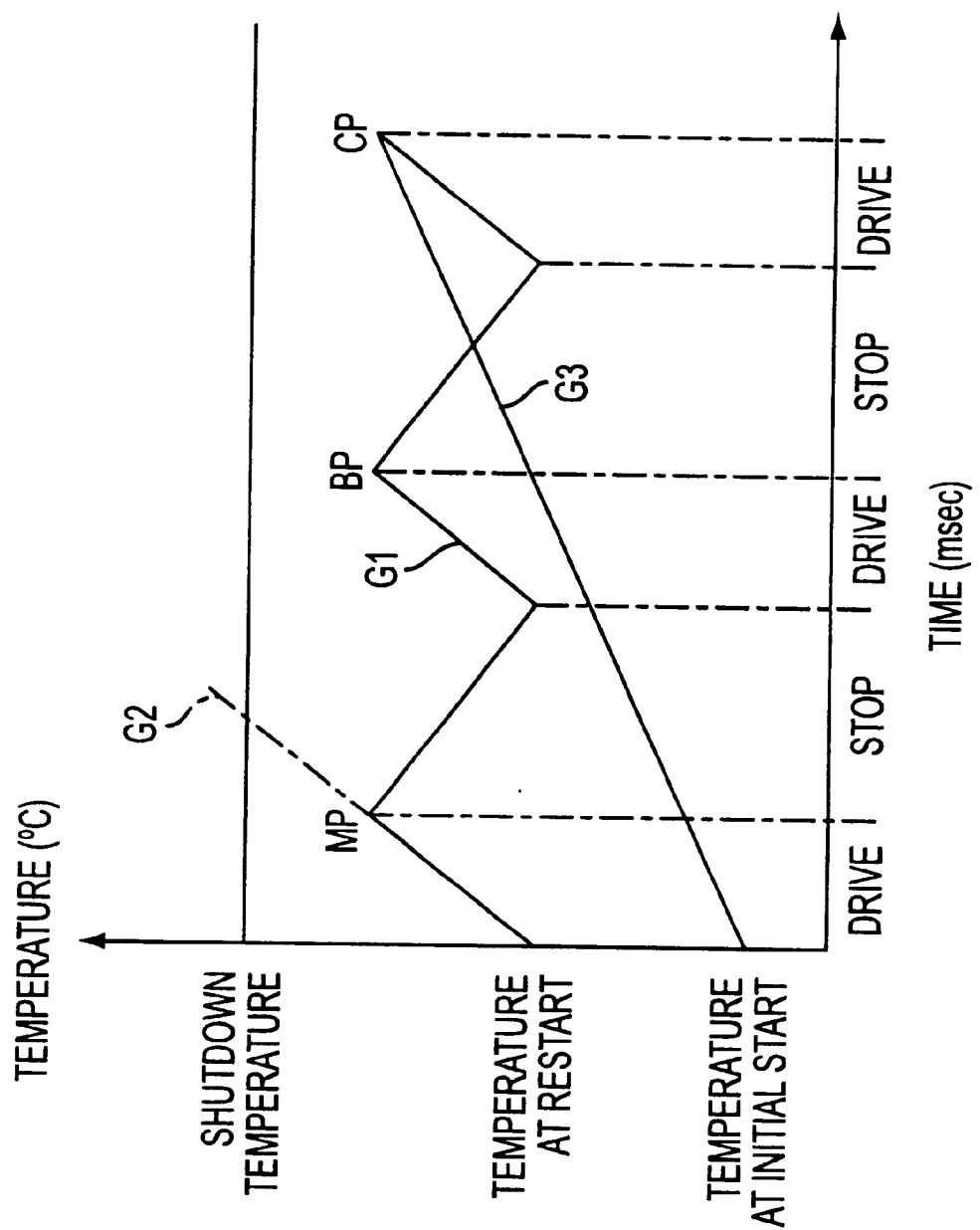
FIG. 7 is a graph expressing the change in temperature associated with the states of operation of the stepping motor of the present invention.

Having RAM 44, which stores the operation history of the stepping motor of skew adjustment unit 37, and second control unit 432, as a command selection unit that selects the control commands to the stepping motor based on the operation history information recorded in this RAM 44, makes it possible to select the appropriate control command for the operation state of the stepping motor before generation and output of the control command at the time of initial operation, thus making it possible to avoid thermal shutdown by a driver IC that drives the stepping motor. Specifically, as shown by G1 in FIG. 7, by causing the stepping motor to operate intermittently, the driver IC is cooled before the thermal shutdown circuit of driver IC is activated, thus making it possible to avoid thermal shutdown. When the stepping motor is made to operate continuously upon restart, the driver IC overheats, its thermal shutdown circuit is activated, and the stepping motor stops, as shown by G2. In contrast, as shown in G3, continuous operation in the case where it is decided that it is an initial start operates from a state in which the driver IC temperature is low, so even if it is operated continuously, the driver IC does not overheat, and the thermal shutdown circuit is not activated. Therefore, because thermal shutdown by the driver IC can thus be avoided, it is possible to prevent any difference arising between the feed amount due to the control command from second control unit 432 and the actual feed amount, and accurate positioning control can be achieved even if it is open-loop control. Furthermore, because the intermittent operation command generated by second control unit 432 includes a command to stop for 300 msec at the turnback points MP and BP of the repetitive operation of optical pickup 32 in initial operation, optical pickup 32 is in stopped stated at turnback points MP and BP, so even if the drive of the stepping motor is stopped at this time, there is no possibility of optical pickup 32 causing stop position displacement, etc. due to inertia, etc., and more reliable positioning control can be achieved. In addition, because it is thus necessary for optical pickup 32 of optical disk device 30 to accurately control positioning in various directions, including tracking, focus, slide feed, and tilt, the adoption of the drive device of the present invention will be very significant In particular, in the case of a tilt command by skew adjustment unit 37, because open-loop control is usually adopted in operation upon startup, high-precision positioning can be achieved without any feedback of the actual feed amount.

Moreover, this invention is not limited to the aforesaid embodiment but also includes modifications such as, but not limited to the following.

In the above described embodiment, in initial operation in tilt position control of optical disk 100 and optical pickup 32, an intermittent operation command is generated by second adjustment unit 432 based on the operation history of the stepping motor. However, it is necessary to drive the stepping motor so that even after the tilt position is positioned in center position CP, this state is maintained, and in this case it suffices to generate and output a control command by intermittent operations as described above, and control may be achieved so that the driver IC does not overheat and the thermal shutdown circuit is not activated.

In addition, in the above described embodiment, the drive device is adopted when a control command to skew adjustment unit 37 is generated by second control unit 432. However, the device of the invention may also be used on another adjustment unit, such as the slide feed adjustment unit or the focus adjustment unit.

In addition, in the above described embodiment, the drive device is adopted for the drive control of optical disk device 30. However, for example, the device may also be adopted if one employs a stepping motor for operation control of the nozzle of a warm water washing toilet seat.

Also, for the specific structure and shape, etc. when implementing this invention, one can have another structure, etc. within the range that allows the purposes of this invention to be achieved.

With the drive device of the invention as described above, by having an operation history memory unit and a command selection unit, the right control command for the state of operation of the motor before generating and outputting a control command can be selected, so thermal shutdown by the driver IC that drives the motor is avoided, any difference between the feed amount due to the control command from the control means and the actual feed amount can be avoided, and accurate positioning control can be achieved.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

Explanation of the Symbols

32 optical pickup (control object)
40 mechanical controller (control means)
44 ram (operation history memory unit)
100 optical disk
432 second control unit (command selection unit)
G1 control command to perform intermittent operation

What is claimed is:

1. A drive device comprising:
   a) a feed mechanism that causes a control object to move in order to control the positioning of said control object,
   b) a motor that serves as the drive source of said feed mechanism, and a control means that controls said motor, said control means including a restart drive detection element that determines whether said drive device has been restarted,
   c) wherein said control means further comprises an operation history memory unit that stores operation history of said motor, and a command selection unit that selects control commands and outputs them to said motor based on information stored in said operation history memory unit, and
   d) wherein said operation history memory unit further comprises information from said restart drive detection element about whether said drive device has been restarted, and wherein said command selection unit selects the control command to intermittently operate said motor when it is determined that said drive device has been restarted.

2. A drive device as described in claim 1, further comprising means to cause said control object to execute a repetitive operation within a prescribed range, said repetitive operation having turnback points, said control command to intermittently operate said motor further comprises a command to stop said motor at the turnback points of said repetitive operation.

3. A drive device as described in claim 1, wherein said control object is an optical pickup that shines an optical spot onto an optical disk and records and/or plays information on said optical disk.

4. A drive device as described in claim 3, wherein said feed mechanism is a mechanism that adjusts the tilt position between said optical disk and said optical pickup.

* * * * *